May 13, 1930. G. L. PARKINSON 1,758,407
TEAPOT
Filed Aug. 27, 1929

Inventor
George Leighton Parkinson
By his Attorney

Patented May 13, 1930

1,758,407

UNITED STATES PATENT OFFICE

GEORGE LEIGHTON PARKINSON, OF EASTWOOD, ENGLAND, ASSIGNOR TO HUGH C. EDMISTON, OF NEW YORK, N. Y.

TEAPOT

Application filed August 27, 1929. Serial No. 388,656.

My invention relates to an improvement in a teapot and the novelty consists in the adaptation and arrangement of parts as will be more fully hereinafter pointed out.

The making of tea is a very old art and by many years of trying of different types of devices it has been found that tea maintains its natural flavor and aroma best if prepared in china or pottery where there is no possibility of foreign flavors injecting themselves into the flavor.

My device is made entirely of pottery or china and there is no metal nor cloth nor other substance from which foreign flavors are derived so that in making tea in my device the tea and water are combined in the desired way, both entirely within china or pottery whereby a tea of finest flavor and aroma is secured.

My device also is made in a simple form whereby it can be readily cleaned by rinsing and the cover of the pot is the only portion which is not integral with the pot.

Figure 1:
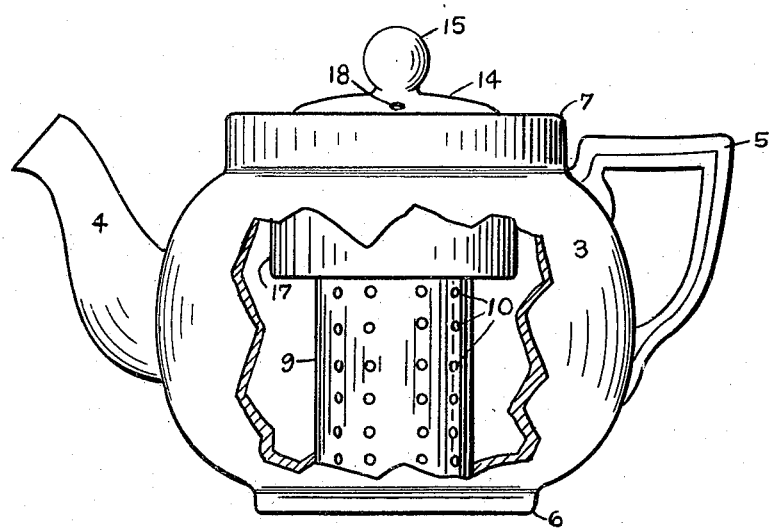

Referring to the drawings Figure 1 is a side elevation of my pot, the middle portion being broken away in order to show the interior construction.

Figure 2:
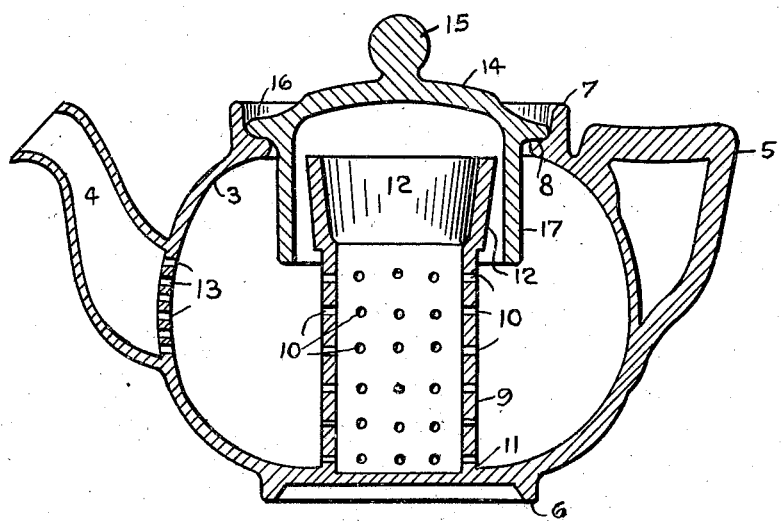

Figure 2 is a vertical section of Figure 1.

In the drawings 3 is a pot having a spout 4 and a handle 5, the bottom of the pot 3 terminating in a circular flange 6 and the upper portion of the pot terminating in a circular flange 7 having a circular lip 8 around the inside of said flange 7:

A container member 9 having openings 10 throughout its body is made integral at its base 11 with the inside of the bottom of the pot 3. The container member 9 terminates at its upper end in a flared portion 12 which facilitates both in placing the tea in the container 9 and in cleaning or rinsing out said container 9 to get all of the tea leaves out of the container 9.

The pot 3 has openings 13 leading to the interior of the spout 4 so that the leaves of tea in the container 9 are first withheld by container 9 through the small openings 10 and any small particles of tea leaves which get into the main body of the pot 3 will again be caught because of the small openings 13 leading to the spout 4.

A cover 14 having a handle 15 and a circular flared portion 16 adapted to rest on the circular lip 8 of the pot 3 terminates at its lower portion in a circular flange 17 which projects into the upper portion of the pot and surrounds the flared portion 12 of the container 9. The cover 14 also has the usual steam escape outlet 18.

In using my pot 3 the tea leaves in the dried form will be placed in the container 9 in the required amount and the boiling water will then be poured thereon whereby the tea leaves will be swollen and the extract from the same mingled with the water which passes readily through the openings 10 of the container 9 into the main body of the pot 3. When sufficient water has been poured thereon the cover 14 will then be placed thereover and it will be noted that the water will be at a point substantially lower than the upper edge of the flared portion 12 of the container 9 in order to prevent the water from flowing on to the lip 8 and the flange 16 of the cover 14 so that the tea leaves which are in the container 9 will be retained therein throughout the tea infusion or tea brewing process whereby the infusion or brewed tea in the body of the pot 3 will be free from tea grounds.

Upon removal of the cover 14 the container 9 can be readily rinsed out and upon inverting the pot 3 the tea grounds and leaves left in the container 9 can be thereby readily removed as the flared portion 12 of the container 9 forms a circle within the boundaries of the circle made by the circular lip 8 of the pot 3 so that upon the inversion of the pot 3 the water and tea grounds and leaves will be ejected directly through the circular opening formed by the circlar lip 8 without any of the tea leaves or grounds getting into the inside of the pot 3.

It will be apparent that variations may be made in the construction of my device without departing from the spirit and intent of the same and that such variations are covered by my disclosure and claims.

I claim:

1. In a tea pot a body having a handle and spout, a foraminous tea container integral within the body at the bottom and open at the top and a cover for said body having a flange fitting over the upper portion of said container and spaced therefrom.

2. In a tea pot a body, a cylindrical foraminous tea container integral within said body at its base and open at its upper end and a cover for said body having a flange fitting over the upper portion of said container and being spaced therefrom all the way around.

3. In a tea pot the combination of a body, a foraminous tea container mounted within said body integral therewith at its base and having an open flaring upper end and a cover for said body having a flange fitting over and spaced from the flaring upper end of said container.

In testimony whereof I affix my signature.

GEORGE LEIGHTON PARKINSON.